Figure 1:
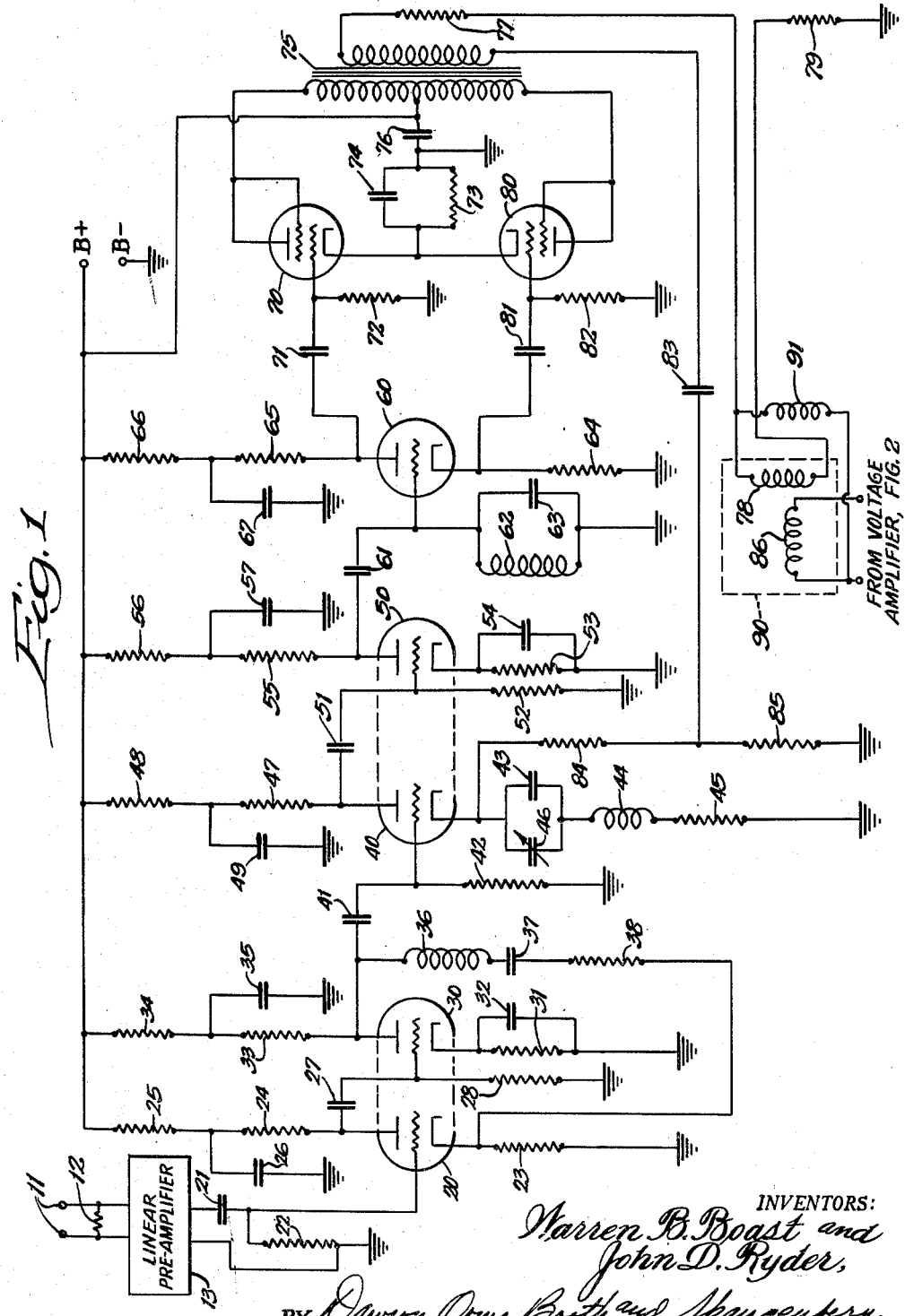

INVENTORS:
Warren B. Boast and
John D. Ryder,
BY Dawson, Ooms, Booth and Spangenberg,
ATTORNEYS.

Patented Dec. 1, 1953

2,661,457

UNITED STATES PATENT OFFICE 2,661,457

WATTMETER-VARMETER

Warren B. Boast, Ames, Iowa, and John D. Ryder, Champaign, Ill., assignors to Iowa State College Research Foundation, Inc., Ames, Iowa, a corporation of Iowa Application March 4, 1950, Serial No. 147,622

10 Claims. (Cl. 324—142)

This application relates to electrical measuring devices; in particular, it concerns an instrument adapted to read directly the watts consumed or reactive volt-amperes circulating in electrical circuits wherein the frequency of the current is too high to permit the successful use of prior-art measuring instruments.

The conventional wattmeter, such as engineers frequently employ in connection with power circuits, is a useful and effective instrument when employed with currents having a frequency of a few cycles per second, as, for example, the 60-cycle current so generally employed in the United States. Such instruments normally consist of two coils mounted in a manner operative to provide interlocking magnetic fields and in a manner such that the axis of one of the coils can rotate relative to the axis of the other coil. The instrument is connected to the circuit to be measured in a manner such that the current through one of the coils is proportional, in phase and magnitude, to the electromotive force applied to the circuit, while the current through the other coil is proportional, in phase and magnitude, to the current flowing in the circuit to be measured. The respective currents set up magnetic fields which interact and cause one of the coils to move relative to the other. The angular deflection produced is proportional to the product of the respective current magnitudes and the cosine of the phase angle between them. Thus, by placing an indicator needle on the moving coil and calibrating a scale in the appropriate manner, the instrument may be made to show directly the quantity of power being consumed in the test circuit.

Conventional instruments of the sort just described are subject to rapidly increasing error as the frequency of the current involved is raised. They are quite accurate at 60 cycles per second, but accurate performance is achieved with difficulty at 400 cycles and such instruments are substantially worthless at higher frequencies.

Direct indication of the watts consumed or the reactive volt-amperes circulating in a particular network is frequently highly desirable in engineering analysis, and the occasion for such measurements is by no means confined to work involving 60-cycle or other low-frequency currents. On the contrary, an accurate, directly-reading wattmeter or varmeter (as instruments for the measurement of reactive volt-amperes are commonly called) suitable for use on relatively high frequencies has long been needed by persons doing development work in the electrical field.

Our invention satisfies this need by providing an instrument capable of measuring accurately, by direct indication, watts or reactive volt-amperes at any desired frequency within exceedingly wide limits. The particular embodiment herein to be described in detail was developed by us as a component of a network analyzer operating at 10,000 cycles per second; accordingly, the specification herein will assume that the currents being dealt with have that frequency. As will be understood by persons skilled in the art, however, faithful adherence to the principles herein disclosed will permit an accurate directly-reading wattmeter and varmeter to be built according to our invention for use on any desired frequency up to a very high value.

Accordingly, it may be stated that one of the objects of this invention is to supply the long-felt need in the electrical art for a directly-reading wattmeter or varmeter which will give accurate results on currents of far higher frequency than those normally employed for power distribution.

Another object of our invention, in furtherance of the broad objective just stated, is to provide a wattmeter or varmeter wherein means are employed which effectively balance out and elimate the effects of capacitance between the wattmeter windings (commonly called, respectively, the "voltage winding" and the "current winding").

A further object is to provide a directly-reading wattmeter for high-frequency currents wherein means are provided to eliminate phase shifts resulting from the self-inductance of the meter windings.

Still another object of our invention is to provide a directly-reading wattmeter for high-frequency currents wherein means are provided to prevent introduction of error resulting from electromotive forces induced in one of the meter coils as a result of currents flowing in the other.

A still further object of our invention is to provide a directly-reading wattmeter for high-frequency currents wherein simple and novel means are provided for converting the instrument into a varmeter by operation of a simple manual switch.

A still further object of our invention is to provide, in a directly-reading wattmeter for high-frequency currents, manually-operable switch means which can, at the operator's will, cause the instrument to read either positive power or negative power. Thanks to this feature, our invention is thus given added versatility, since it is not confined in its usefulness to measurements involving passive networks only.

Other objects and advantages of our invention will appear as the specification proceeds.

Figure 2:
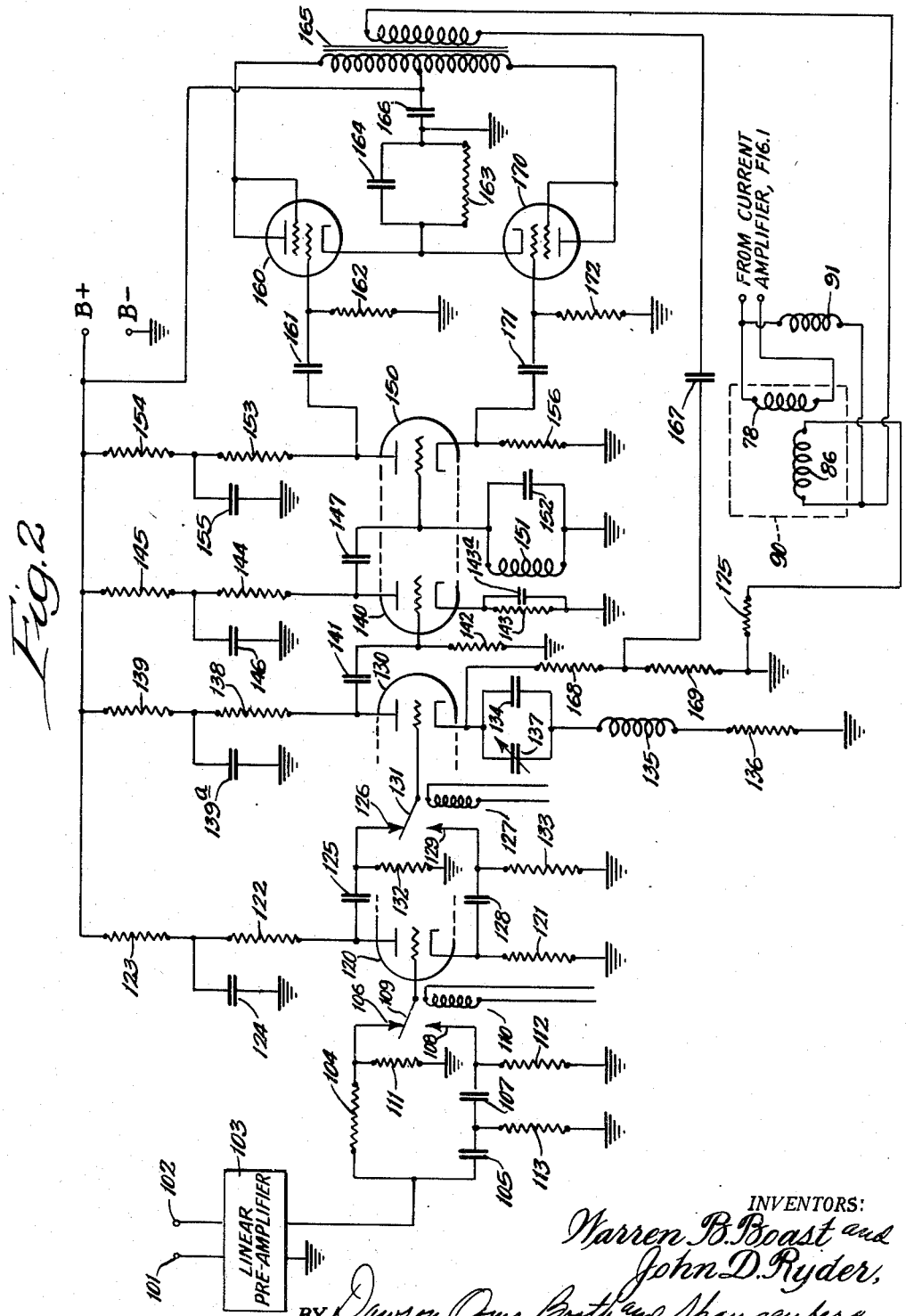

We have, in the appended drawing, shown for illustrative purposes an embodiment of our invention designed for use as a part of a network analyzer operated by currents having a frequency of 10,000 cycles per second. In the drawing, Figure 1 shows schematically the wiring diagram of the indicating instrument proper and the current amplifier which supplies to one of the indicator coils a current proportional in magnitude and phase to the current flowing in the test circuit. Fig. 2 of the drawing is a schematic showing of the indicating instrument proper plus the voltage amplifier which operates to supply to the other indicator coil a current proportional in magnitude and phase to the electromotive force applied to the test circuit.

As shown in Fig. 1, the input element which "samples" the current flowing in the test circuit includes a pair of terminals 11. These terminals are shunted by a standard resistor 12, the value of which may be of the order of one-tenth ohm. The voltage drop across resistor 12 is fed to and amplified by a linear pre-amplifier 13 which, normally, will be located very close to input terminals 11 and standard resistor 12. Since the wiring of pre-amplifier 13 may be conventional, it is shown in the drawing only in block form. The purpose of pre-amplifier 13 is to permit the sensitive "sampling" element 12 to be situated immediately at the input terminals 11 and to eliminate long leads which might otherwise be necessary to connect the sampling resistor 12 to the input of the wattmeter proper. Ordinarily, pre-amplifier 13 can be designed very compactly. Its output should be at a relatively low impedance level and should be great enough in magnitude to swamp out the effects of stray fields to which the connecting cable might be exposed.

The output of pre-amplifier 13 is fed, via a suitable connecting cable, to the grid of tube 20 through a coupling circuit consisting of capacitor 21 and resistance 22. Coupling circuit 21, 22 is proportioned to pass the voltage output of amplifier 13 onto the grid of tube 20 without any appreciable phase shift; that is, its time constant is many times the period of the applied voltage.

The cathode of tube 20 is connected to ground through biasing resistor 23. The plate of tube 20 is connected through plate load resistor 24 and decoupling resistor 25 to the positive side of a suitable voltage source (not shown). The negative side of said voltage source is grounded. By-pass capacitor 26 is connected between ground and the junction of resistors 24 and 25.

A coupling circuit comprising capacitor 27 and resistor 28 couples the plate of tube 20 to the grid of tube 30. Tubes 20 and 30 may, if desired, be the components of a twin triode as indicated in the drawing.

The cathode of tube 30 is connected to ground through biasing resistor 31. Resistor 31 is by-passed by capacitor 32. The plate of tube 30 is connected to the voltage source through plate load resistor 33 and decoupling resistor 34. By-pass capacitor 35 is connected between ground and the junction of resistors 33 and 34.

A feedback circuit comprising inductor 36, capacitor 37, and resistor 38, connected in series, joins the plate of tube 30 with the cathode of tube 20. Inductor 36 and capacitor 37 are chosen so as to provide substantial series resonance at the frequency of the currents being dealt with.

A coupling capacitor 41 is connected between the plate of tube 30 and the grid of tube 40, while resistor 42 is connected between the grid of tube 40 and ground. The cathode of tube 40 is connected to ground through a series circuit consisting of capacitor 43, inductor 44, and resistor 45. Capacitor 43 is shunted by a small variable capacitor 46 which is employed to permit fine variation of the total capacitance. The capacitance and inductance in the series circuit just described are chosen so as to bring the condition of series resonance at some mid-capacitance setting of variable capacitor 46.

The plate of tube 40 is connected to the positive voltage source through plate load resistor 47 and decoupling resistor 48. The junction of resistors 47 and 48 is connected to ground through by-pass condenser 49. Coupling capacitor 51 joins the plate of tube 40 to the grid of tube 50 which, as shown, may with tube 40 form a twin triode. The grid of tube 50 is connected to ground through resistor 52. The cathode of tube 50 is connected to ground through biasing resistor 53, which is shunted by by-pass capacitor 54. The plate of tube 50 is connected to the positive voltage source through plate load resistor 55 and decoupling resistor 56. By-pass capacitor 57 joins the junction of resistors 55 and 56 to ground.

The plate of tube 50 is connected to the grid of tube 60 by coupling capacitor 61. The grid of tube 60 is connected to ground through the parallel combination consisting of inductor 62 and capacitor 63. The two last-mentioned elements are chosen so as to provide parallel resonance at the frequency of the current being dealt with.

The cathode of tube 60 is connected to ground through biasing resistor 64. The plate of tube 60 is connected to the positive voltage source through plate load resistor 65 and decoupling resistor 66. A by-pass capacitor 67 joins the junction of resistors 65 and 66 to ground. Since tube 60 is employed as a phase-splitting tube, cathode resistor 64 is not by-passed and resistors 64 and 65 are carefully chosen to have identical values of resistance.

The plate of tube 60 is joined to the control grid of tube 70 by coupling capacitor 71, said control grid being connected to ground through resistor 72. Similarly, the cathode of tube 60 is connected to the control grid of tube 80 by coupling capacitor 81, said control grid being also connected to ground through resistor 82.

Tubes 70 and 80 collectively constitute a push-pull linear amplifier. In the illustrated embodiment, tetrode tubes are employed with their respective plates and screens tied together so as to give triode operation. The cathodes of tubes 70 and 80 are connected together and are connected to ground through biasing resistor 73 and by-pass capacitor 74, elements 73 and 74 being connected in parallel. The plates of tubes 70 and 80 are respectively connected to the primary terminals of output transformer 75, the center tap of such primary coil being connected to the positive voltage source and, through by-pass capacitor 76, to ground. One terminal of the secondary winding of transformer 75 is connected through resistor 77 to one terminal of the current-responsive coil 78 in indicator unit 90. The other terminal of coil 78 is connected through a small resistor 79 to ground. Resistor 79 is employed in the illustrated embodiment solely as a means of providing a convenient test-point for observing on an oscilloscope the wave form of the current in coil 78. It may accordingly be dispensed with if desired, in which case the other terminal of coil 78 is directly grounded.

The other terminal of the secondary winding of transformer 75 is connected through capacitor 83 and resistor 84 to the cathode of tube 40, the junction of resistor 84 and capacitor 83 being connected to ground through resistor 85. The last-mentioned elements constitute a feedback circuit which provides heavy current-controlled negative feedback in the portion of the apparatus comprising tubes 40, 50, 60, 70, and 80. The combined effect of transformer 75 and the heavy current-controlled negative feedback is to make the magnitude and phase of the current flowing through coil 78 dependent almost entirely on the phase and magnitude of the voltage across resistor 12 and substantially independent of the position of coil 78 or the nature of voltages induced therein by electromagnetic induction.

The wattmeter indicator unit 90 contains, in addition to current-responsive coil 78, the voltage-responsive coil 86. Coils 78 and 86 should be mechanically mounted so that rotation of one relative to the other is possible upon the application of slight torque, it being immaterial which of the two coils is made movable and which held stationary.

Turning now to Fig. 2 we shall describe the structure of the voltage-responsive portion of our watt-varmeter. A pair of input terminals 101 and 102 may be connected across the circuit element or network to be studied; the input terminals 101 and 102 are connected to the input of a linear pre-amplifier 103, shown in block form. The output of pre-amplifier 103 is connected through a suitable connecting cable to one terminal of resistor 104 and one terminal of capacitor 105. The other terminal of resistor 104 is connected to contact 106 of a double-throw relay 110; the other terminal of capacitor 105 is connected in series with capacitor 107 to the other contact of relay 110, denoted on the drawing 108. The actuating coil of relay 110 may be connected in series with a voltage source and a manual switch (not shown). The arm 109 of relay 110 is connected to the grid of tube 120. Contact 106 is connected to ground through resistor 111 which forms, with resistor 104, a resistive voltage divider network. Contact 108 is connected to ground through resistor 112, and the junction of capacitors 105 and 107 is connected to ground through resistor 113. Elements 105, 113, 107, and 112 collectively constitute a tandem resistance-capacitance divider network, the values of which are chosen to yield a phase shift of 90° at the frequency of the current being dealt with.

The cathode of tube 120 is connected to ground through biasing resistor 121. The plate of tube 120 is connected to a positive voltage source through plate load resistor 122 and decoupling resistor 123. The junction of resistors 122 and 123 is connected to ground through by-pass capacitor 124. Tube 120 is employed for a novel purpose to be described in detail hereinafter; in furtherance of that purpose, cathode resistor 121 is not by-passed and resistors 121 and 122 are carefully chosen to have identical values of resistance.

A coupling condenser 125 connects the plate of tube 120 to contact 126 of relay 127. Coupling capacitor 128 connects the cathode of tube 120 to contact 129 of relay 127. Moving contact or arm 131 of relay 127 is connected to the grid of tube 130, contact 131 being in engagement with either contact 126 or 129 depending on whether the coil of relay 127 is energized. Contact 126 is connected to ground through resistor 132 and contact 129 is connected to ground through resistor 133.

The cathode of tube 130 is connected to ground through a series circuit consisting of capacitor 134, inductor 135, and resistor 136. Capacitor 134 is shunted by variable capacitor 137, to permit fine variation of the total capacitance. The values of elements 134 and 135 are chosen so as to produce series resonance at the operating frequency at some mid-setting of variable capacitor 137. The plate of tube 130 is connected to the positive voltage source through plate load resistor 138 and decoupling resistor 139. By-pass capacitor 139a joins the junction of resistors 138 and 139 to ground.

Coupling capacitor 141 connects the plate of tube 130 to the grid of tube 140, while resistor 142 connects the grid of tube 140 to ground. The cathode of tube 140 is connected to ground through biasing resistor 143, shunted by by-pass capacitor 143a. The plate of tube 140 is connected to the positive voltage source through plate load resistor 144 and decoupling resistor 145. By-pass capacitor 146 connects the junction of resistors 144 and 145 to ground. Coupling capacitor 147 connects the plate of tube 140 to the grid of tube 150, said grid being connected to ground through a parallel resonant circuit consisting of inductor 151 and capacitor 152. The plate of tube 150 is connected to the positive voltage source through plate load resistor 153 and decoupling resistor 154. By-pass capacitor 155 connects the junction of resistors 153 and 154 to ground. The cathode of tube 150 is connected to ground through resistor 156. Tube 150 is employed as a phase-splitting tube, and accordingly resistor 156 and resistor 153 are carefully chosen to have identical values of resistance.

A coupling capacitor 161 joins the plate of tube 150 to the control grid of tube 160. A coupling capacitor 171 joins the cathode of tube 150 to the control grid of tube 170. Resistor 162 is connected between the control grid of tube 160 and ground, while resistor 172 is connected between the control grid of tube 170 and ground.

Tubes 160 and 170 collectively constitute a push-pull linear amplifier, and, as with the current-responsive amplifier already described, we have elected to use tetrode tubes triode-connected—that is, with their screens respectively tied to their plates. Any suitable tubes may be employed, although we have found that triode circuits are desirable.

The cathodes of tubes 160 and 170 are tied together and connected to ground through biasing resistor 163, such resistor being shunted by by-pass capacitor 164. The plate and screen grid of tube 160 are tied together and connected to one terminal of the primary coil of transformer 165, while the other terminal of the primary coil is connected to the plate and screen of tube 170. The center tap of the primary coil of transformer 165 is connected to the positive voltage source and is also by-passed to ground through capacitor 166.

One terminal of the secondary coil of transformer 165 is connected to one terminal of the voltage-responsive coil 86 in wattmeter indicator unit 90, the other terminal of coil 86 being connected to ground through resistor 175.

The other terminal of the secondary coil of transformer 165 is connected to the cathode of tube 130 through capacitor 167 and resistor 168. The junction of capacitor 167 and resistor 168 is connected to ground through resistor 169.

An inductor 91 is connected between the "hot" side of coil 78 and the "hot" side of coil 86. That is, coil 91 is connected between the respective terminals of coils 86 and 78 which are most remote from ground. Coil 91 performs an interesting and novel function which will be more fully described hereinafter.

As with the current-responsive amplifier already described, elements 167, 168, and 169 form a feedback network which provides heavy current-controlled negative feedback in the portion of the circuit comprising tubes 130, 140, 150, 160, and 170. Similarly, the transformer 165, coupled with the heavy current-controlled negative feedback, operates to make the current in coil 86 entirely dependent, for all practical purposes, on the amplitude and phase of the input voltage and almost totally independent of the position of coil 86 relative to coil 78 and of voltage induced in coil 86 by electromagnetic induction.

As indicated on the drawing, tubes 120 and 130 may constitute a twin triode and, similarly, tubes 140 and 150 may be the respective halves of such a tube.

Capacitor 83 is chosen to provide, with the inductance of the secondary winding of transformer 75 and the inductance of meter coil 78, a series-resonant circuit embracing elements 83, 85, 79, 78, 77, and the secondary coil of transformer 75.

Similarly, capacitor 167 is chosen to provide series resonance at the operating frequency with the inductance in the secondary coil of transformer 165 and the inductance of voltage-responsive meter coil 86. Thus a series-resonant loop is formed which embraces elements 167, 169, 175, 86, and the secondary winding of transformer 165.

*Operation*

In the operation of our invention, the line carrying current to the element or network to be studied is broken and input terminals 11 placed in series therewith. This causes the current to flow through standard resistor 12 and accordingly imposes on the input to pre-amplifier 13 an electromotive force which is proportional in magnitude and identical in phase to the current flowing in the circuit to be studied.

At the same time, input terminals 101 and 102 are connected across the element or network to be studied, with the result that the electromotive force which exists across the circuit element under consideration is applied to the input of pre-amplifier 103.

In the original calibration and adjustment of our wattmeter, suitable adjustment of the over-all amplification of the pre-amplifiers 13 and 103 must be made to place the range of variation of currents in the meter coils within practical values. That is, if the currents and voltages normally to be measured are very small, so that full-scale deflection of the wattmeter is to be attained at, for example, one watt, the pre-amplifier gains would be set much higher than if the instrument were to be used for working in circuits with higher power levels. Also, it is desirable that the pre-amplifier gain levels be adjusted so that in normal use the current in the current-responsive coil is of the same order of magnitude as the current in the voltage-responsive coil, since the sensitivity and accuracy are substantially higher when the currents are of the same order.

The principal sources of error in a wattmeter intended for use on high-frequency currents lie within the indicator mechanism itself.

In prior-art wattmeters, when employed on high-frequency currents, interaction between the coils has made accurate calibration impossible. High-frequency current flowing in one coil would induce electromotive forces in the other which would directly affect both the magnitude and phase of the current flowing in the second coil. As a result, the meter deflection would not be accurately proportional to the scalar product of the current and voltage taken from the circuit or network being studied. If the instrument were calibrated to show accurately the product of one volt and one ampere as one watt, for example, then the instrument would not show one watt when the E. M. F. were raised to two volts and the current cut to one-half ampere, for the reason that the increased current in the voltage-responsive coil would thus affect the current flowing therein, in magnitude or phase or both.

The degree of mutual coupling between the coils, moreover, is directly a function of their relative physical positions, so that a prior-art instrument which was relatively accurate at one portion of its scale would be hopelessly in error on other portions.

In our invention, interaction between the coils of the indicator has been effectively eliminated, with the result that our instrument is accurate over its entire scale.

The effects of mutual induction between the indicator coils has been eliminated in our invention by providing, through the feedback networks and output transformers already described, an extremely high effective source impedance for the current supplied to the coils. As a result, electromotive forces induced in the respective coils due to mutual induction with one another have only negligible effect on the amplitude and phase of the currents flowing therein.

Moreover, capacitive effects existing between the coils, which, in high-frequency applications, would otherwise cause serious errors, are eliminated by the use of inductor 91, bridged between the hot side of coil 78 and the hot side of coil 86. Inductor 91 is proportioned to provide parallel resonance at the operating frequency with the distributed capacitance existing between coils 78 and 86. The effect of inductor 91 is to raise to an almost infinite value the impedance coupling the two coils.

Finally, the accuracy and stability of the instrument are further improved by the novel structure wherein the self-inductance of coils 78 and 86 are resonated by means of capacitors 83 and 167 respectively, so that the amplifiers are at all times working into resistive loads and the feedback which is accomplished by the feedback loops already described has no effect on the phase of the current in the indicating coils.

This last-mentioned feature is of very great importance, since the feedback, which is essential to eliminate interaction between the coils, would introduce phase errors but for the employment of series resonance in the feedback loop.

The operation of relay 110 has the interesting effect of shifting the instrument at will from one which reads power in watts to one which reads reactive volt-amperes. The resistance-capacitance network comprising elements 105, 113, 107, and 112 has the effect of shifting by 90° the phase of the voltage applied to the grid of tube 120 and thus shifts by 90° the phase of the current in coil 86.

In addition to shifting the phase of the voltage applied to the grid of tube 120, the resistance-capacitance network also reduces substantially the amplitude of the voltage. The resistance network 104, 111 is proportional in such manner as to reduce the voltage output from amplifier 103 in precisely the same proportion as does the resistance-capacitance network already mentioned. As a result, actuation of relay 110, switching contact arm 109 between one position and the other, instantly shifts the instrument from a wattmeter to a varmeter while having no effect whatever on the operation in other respects.

Measurement of the power in a passive network does not require any means for measuring negative watts, since the voltage and current in such a network can never be more than 90° out of phase with one another. The usefulness of a watt-varmeter can be greatly increased, however, if it is capable of measuring negative watts and both positive and negative volt-amperes, since it makes possible its use in the study of networks which include energy sources. In our invention we have provided a simple and novel means for measurements of negative watts and reactive volt-amperes, involving the tube 120 and the relay 127. Tube 120 has an unby-passed cathode resistor 121 equal in magnitude to the plate load resistor 122. As a result, the alternating component of voltage at the cathode of tube 120 is equal to that at the plate while differing in phase by 180°. The relay 127 permits, by a manual switching operation, the selection of either the plate or cathode voltage for driving the grid of tube 130. Thus, by actuation of relay 127, the instrument can be made to indicate positive or negative values at will, actuation of the switch controlling relay 127 having no other effect whatever on the operation of the instrument.

While we have in this specification described in detail one embodiment of our invention for purposes of illustration, persons skilled in the art may introduce many variations in detail therein without departing from the spirit of our invention. Therefore, we do not desire that the scope of our invention be limited to the particular form of the invention shown, but wish that such scope be determined primarily by reference to the appended claims.

We claim:

1. An instrument for measuring power in an electrical network comprising first input means adapted for connection to the network for producing an ouput current proportional in amplitude and identical in phase to the voltage across the network, second input means adapted for connection to the network for producing an output current proportional in amplitude and identical in phase to the current flowing in the network, amplifier means for each of said input means, a pair of coils mounted for relative movement, and circuit means connecting one of said amplifiers to one of the coils and the other of said amplifiers to the other coil, each of said circuit means comprising a negative-feedback loop in which the feedback voltage is controlled by the current in the coil, each of said feedback loops comprising means for producing series resonance around the loop at the frequency of the current flowing in the network.

2. A combined wattmeter and varmeter for measuring watts or reactive circulating volt-amperes in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, amplifier means for each of said input means, a pair of coils mounted for relative movement, circuit means connecting one amplifier to one coil and the other amplifier to the other coil, each of said circuit means comprising a negative feedback loop containing a capacitor operative to produce series resonance around the loop at the frequency of the current flowing in the network, the feedback voltage being controlled by the current in the coil, a resistance-reactance phase-shifting network in one of said amplifiers operative to effect a phase-shift of 90° in the applied voltage and to attenuate said voltage in amplitude, said amplifier containing also a resistance voltage-divider network operative to attenuate the applied voltage in amplitude to the same degree as said phase-shifting network, and manually controllable switch means operative at will to switch one or the other of said networks into the signal channel of said amplifier.

3. Apparatus according to claim 2 having an inductor connected between the two coils, said inductor having substantially the value of inductance necessary for parallel resonance with the capacitance between the coils at the frequency of the current in the network.

4. An instrument for measuring power in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, a pair of coils mounted for relative movement, and circuit means connecting said first input means to one of the coils and the second input means to the other coil, each of said circuit means comprising a negative-feedback loop in which the feedback voltage is controlled by the current in the coil, each of said feedback loops comprising means for producing series resonance around the loop at the frequency of the current flowing in the network.

5. The structure of claim 4 in which an inductor is connected between said coils, and said inductor has substantially the value of inductance necessary for parallel resonance with the capacitance between the coils at the frequency of the current flowing in the network.

6. An instrument for measuring power in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, a pair of coils mounted for relative movement, and circuit means connecting said first input means to one of the coils and the second input means to the other coil, each of said circuit means comprising a negative-feedback loop in which the feedback voltage is controlled by the current in the coil, and an inductor connected between said coils, said inductor having substantially the value of inductance necessary for parallel resonance with the capacitance between the coils at the frequency of the current flowing in the network.

7. An instrument for measuring power in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, amplifier means for each of said input means, a pair of coils mounted for relative movement, and circuit means connecting one of said amplifiers to one of the coils and the other of said amplifiers to the other coil, each of said circuit means comprising a negative-feedback loop in which the feedback voltage is controlled by the current in the coil, each of said feedback loops comprising a capacitor operative to produce series resonance around the loop at the frequency of the current flowing in the network.

8. An instrument for measuring power in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, amplifier means for each of said input means, a pair of coils mounted for relative movement, circuit means connecting one of said amplifiers to one of the coils and the other of said amplifiers to the other coil, each of said circuit means comprising a negative-feedback loop in which the feedback voltage is controlled by the current in the coil, and an inductor connected between the two coils, said inductor having substantially the value of inductance necessary for parallel resonance with the capacitance between the coils at the frequency of the current flowing in the network.

9. An instrument for measuring power in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, amplifier means for each of said input means, a pair of coils mounted for relative movement, circuit means connecting one of said amplifiers to one of the coils and the other of said amplifiers to the other coil, each of said circuit means comprising a negative-feedback loop in which the feedback voltage is controlled by the current in the coil, each of said feedback loops comprising a capacitor operative to produce series resonance around the loop at the frequency of the current flowing in the network, and an inductor connected between the two coils, said inductor having substantially the value of inductance necessary for parallel resonance with the capacitance between the coils at the frequency of the current flowing in the network.

10. An instrument for measuring power in an electrical network comprising first input means adapted for connection to the network for producing an output current proportional in amplitude and identical in phase to the voltage across the network, second input means adapted for connection to the network for producing an output current proportional in amplitude and identical in phase to the current flowing in the network, amplifier means for each of said input means, a pair of coils mounted for relative movement, circuit means connecting one of said amplifiers to one of the coils and the other of said amplifiers to the other coil, each of said circuit means comprising a negative-feedback loop in which the feedback voltage is controlled by the current in the coil, one of said amplifiers comprising a vacuum tube having equal load resistances in the anode and cathode circuits, and manually controllable switch means operative to select and feed to the following tube at the operator's will either the alternating component of cathode voltage or the alternating component of plate voltage.

WARREN B. BOAST.
JOHN D. RYDER.

References Cited in the file of this patent

UNITED STATES PATENTS

| Number | Name | Date |
|---|---|---|
| 1,708,944 | Heising | Apr. 16, 1929 |
| 1,822,758 | Toulon | Sept. 8, 1931 |
| 2,050,834 | Farnham | Aug. 11, 1936 |
| 2,173,487 | Seright | Sept. 19, 1939 |
| 2,267,184 | Bagno | Dec. 23, 1941 |
| 2,272,712 | Johnson | Feb. 10, 1942 |
| 2,314,851 | Barney et al. | Mar. 23, 1943 |
| 2,351,353 | McCarty | June 13, 1944 |
| 2,358,480 | Skilling | Sept. 19, 1944 |
| 2,368,351 | Ewen | Jan. 30, 1945 |

OTHER REFERENCES

Publication I, "The Measurement of Reactive Power," Weston Engineering Notes, vol. 2, number 2, April 1947, pages 1 and 2. (Copy in Division 69.)